United States Patent
Weinberg

(10) Patent No.: US 7,255,764 B2
(45) Date of Patent: Aug. 14, 2007

(54) CLOSING BANDING

(75) Inventor: Uwe Weinberg, Uetersen (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/477,803

(22) PCT Filed: Apr. 18, 2002

(86) PCT No.: PCT/EP02/04285

§ 371 (c)(1),
(2), (4) Date: Apr. 29, 2004

(87) PCT Pub. No.: WO02/092713

PCT Pub. Date: Nov. 21, 2002

(65) Prior Publication Data

US 2005/0000627 A1 Jan. 6, 2005

(30) Foreign Application Priority Data

May 17, 2001 (DE) .................................. 101 23 980

(51) Int. Cl.
*B29C 63/06* (2006.01)
*B32B 37/22* (2006.01)
*B32B 38/10* (2006.01)

(52) U.S. Cl. ..................... 156/187; 156/159; 156/254; 156/256; 242/556.1

(58) Field of Classification Search ................ 156/159, 156/502, 504, 517, 256, 187, 254; 242/551, 242/553, 555.3, 555.4, 556.1; 428/41.7, 428/41.8, 57, 343

See application file for complete search history.

(56) References Cited

U.S. PATENT DOCUMENTS

| 2,149,832 A * | 3/1939 | Bernard .................... 242/556.1 |
| 4,564,150 A | 1/1986 | Keene et al. |
| 4,905,924 A | 3/1990 | Moore |
| 5,212,002 A * | 5/1993 | Madrzak et al. ............ 428/41.9 |
| 5,348,793 A * | 9/1994 | Stettner .................... 428/211.1 |
| 5,702,555 A * | 12/1997 | Caudal et al. .............. 156/247 |
| 5,901,919 A * | 5/1999 | Wienberg ................. 242/556.1 |
| 5,919,651 A | 7/1999 | Hitzeman et al. |
| 5,996,927 A | 12/1999 | Weirauch et al. ......... 242/556.1 |
| 6,416,604 B1 | 7/2002 | Nootbaar et al. ........... 156/157 |
| 2003/0190445 A1 * | 10/2003 | Nootbaar .................... 428/40.1 |

FOREIGN PATENT DOCUMENTS

| DE | 198 30 674 A1 | 1/2000 |
| DE | 199 02 179 A1 | 8/2000 |
| EP | 0 970 904 A1 | 1/2000 |

* cited by examiner

*Primary Examiner*—Mark A. Osele
(74) *Attorney, Agent, or Firm*—Norris McLaughlin & Marcus PA

(57) ABSTRACT

A closing banding (1) for a bobbin (2), in particular for a bobbin (2) of cigarette paper, comprising
  a) a paper carrier (3) which is coated with a self-adhesive compound (6) on its underside (4) in the region of the upper transverse edge (5), and
  b) has a non-adhesive tab (8) in the region of the lower transverse edge (7), opposite the upper transverse edge (5),
characterized by
  c) a double-sided adhesive tape (9) which is arranged on the underside (4) of the paper carrier (3), between the self-adhesive compound (6) and the tab (8),
  d) the double-sided adhesive tape (9) having a cleavable paper carrier (10) which is coated on both sides with self-adhesive compound (11).

18 Claims, 1 Drawing Sheet

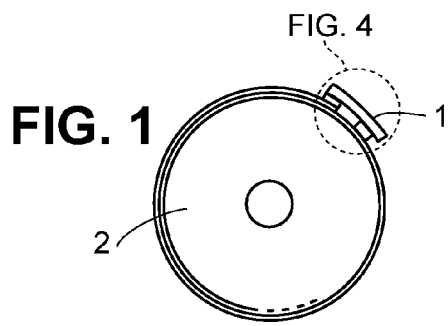
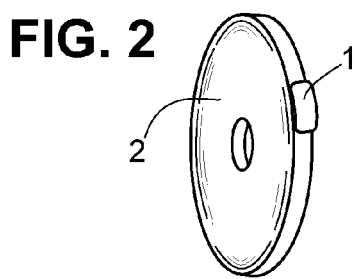
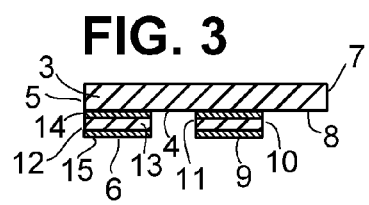
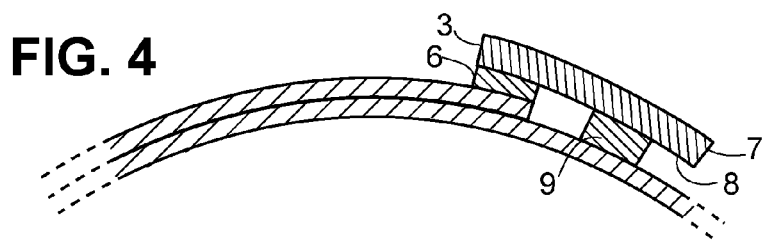
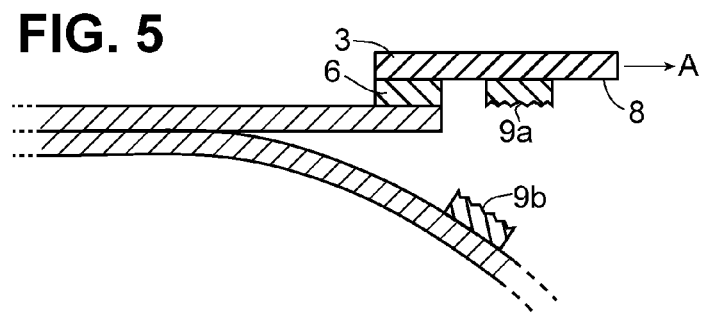
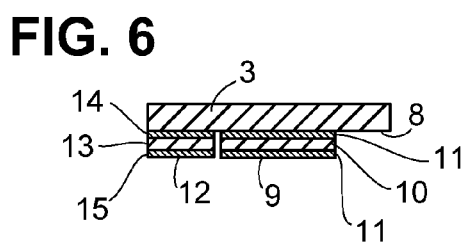

CLOSING BANDING

This application is a 371 of PCT/EP02/04285, filed on Apr. 18, 2002.

The invention relates to a closing banding for a bobbin, in particular for one of cigarette paper.

Widespread use is made of bobbins, thin material, in particular paper, wound into narrow rolls. For example, narrow rolls of cigarette paper are processed to a great extent, as a rule as cigarette paper rolls of 26.5 mm width. These are already produced in the paper mill and equipped with attachment adhesive tapes, in order to secure the uppermost layer and permit trouble-free transport and subsequent use. These attachment adhesive tapes are referred to as "closers" in specialist circles and consist of adhesive labels about 180 mm long and 26.5 mm wide with a paper carrier and a tab, at which the label can be gripped, in particular also by a machine, in order to tear it off from the second layer and to insert the bobbin into a machine, in particular a cigarette machine.

Robots of this type run extremely quickly and need appropriate reserves. Thus, as a rule it is necessary to insert a new cigarette paper roll every 5 minutes, and the trouble-free fixing and holding of the uppermost layer of such a roll is needed correspondingly often until said roll has to be released again quickly and without difficulty.

It is precisely in the case of sensitive, lightweight papers, such as is the case in cigarette paper with a grammage of about 13 $g/m^2$, that care has to be taken that when the bobbins are opened, that is to say when the label is pulled off, the tearing force which develops does not lead to the paper layer lifting and possibly tearing. For this purpose, it is normal to cover the uppermost layer with a packaging paper, which is bonded adhesively to the cigarette paper and, before actual use in the cigarette machine, has to be torn off and disposed of.

It is equally necessary to fix and to hold this uppermost layer—this is where the present invention begins.

This is because delicate movement of the seam is necessary in order to handle the sensitive material—the cigarette paper—in a suitable way, since the bobbins, depending on the external conditions, are subject to changes and, so to speak, "work", for example given a different moisture content of the surroundings, in the event of temperature fluctuations, etc., so that the label used to secure them must also withstand these loadings.

In addition, it is desirable for the separation of the securing means or the label to be carried out easily and without material damage, but without detrimental effect on the functioning of a fixing of the uppermost layer. It is also desirable that, following the separation and insertion into the cigarette machine or the like, no adhesive regions disrupt and lead to problems. Finally, it is also desirable that all the components are "pure", that is they consist of paper or materials which, together with paper, are not disruptive, that is to say they are possibly water-soluble or can be recycled together with paper.

Furthermore, it is desirable that the bobbins with auxiliary materials or materials to be used other than paper, such as the aluminum foil used in cigarette production, packaging film, for example of PP, board and the like, can be finished secured and can be opened in the same way.

For this purpose, self-adhesive labels or self-adhesive tapes which can be "opened" easily are known, by a tab provided being pulled and the adhesive being separated via point-like adhesive points, as is known, for example, with reversibly adhesive notelets equipped with point-like adhesive points. In this case, both the end of the uppermost layer and the second layer located underneath are bonded over. The separation of the bonding is, however, either carried out in all too easy a manner, so that undesired separation can take place, or with excessive difficulty, depending on the material and adhesive force. In addition, adhesive regions of the separated layers are disruptive during the further sequence.

Adhesive tapes with cleavable paper carriers are also known, and are used for a reel change, in particular a flying reel change, in order not to have to stop the machine when a web runs out. An example is the use of a cleavable paper carrier cleaving and covering the bonding points in a non-adhesive manner with its residues. Such tapes are double-sided adhesive tapes which are bonded under or over the end of the uppermost layer and, at the same time, to the second layer lying underneath, cf. U.S. Pat. No. 5,702,555, DE 196 28 317 A1, DE 196 32 689 A1, DE 198 30 673 A1, DE 198 30 674 A1, DE 199 02 179 A1.

The double-sided adhesive tapes described in these documents are only to a certain extent suitable for securing the bobbins mentioned here, particularly since these are not intended to be used for a flying reel change but instead for fixing the uppermost layer for transport, etc., and for the easy but not undesired and trouble-free opening—the attachment to a web that is running out or the insertion into a processing machine is only carried out subsequently and is not the subject of the technical problem treated here.

It was therefore an object of the invention, for fixing and holding the uppermost layer of a bobbin and for the subsequent easy and trouble-free separation of this holding means, to find a solution which circumvents or reduces the difficulties which have occurred hitherto.

Accordingly, the invention relates to a closing banding as characterized in more detail in the claims.

In this case, according to the invention, a single-sided adhesive product is proposed, not a double-sided adhesive one, as is known, for example, for the flying reel change.

In order to avoid unnecessary repetitions, reference is also expressly made to the subclaims.

According to the invention, the fixing of the uppermost layer of a bobbin of cigarette paper succeeds securely and permanently, temperature and humidity fluctuations are tolerated well and also the subsequent separation for insertion into the cigarette machine succeeds without difficulty, without undesired opening or separation of the adhesive bond occurring. Disruptive adhesive regions are not produced, disposal is carried out without problems, single-grade operation is ensured.

Diverse cleavable paper systems are suitable as cleavable paper carriers, such as Duplex papers (papers laminated together in a defined manner, the cleavage operation proceeds extremely homogeneously and no stress peaks are produced, for example as a result of inhomogeneous compaction. These papers are used for the production of wall coverings and filters.

Easily cleavable paper systems

Highly compacted papers glued together in a defined manner (→paper with a high cleavage strength). The glueing can be carried out, for example, with starch, starch-containing derivatives, wallcovering adhesives based on methylcellulose (Methylan®, Henkel KGaA, Düsseldorf) but also based on polyvinyl alcohol derivatives.

All typical contact adhesive compounds are suitable as the self-adhesive compound, in particular acrylates (water-soluble and water-insoluble)

natural rubber compounds, synthetic rubber compounds

The drawings show schematic representations of closing bandings according to the invention in cross section and are intended to explain the invention by way of example. The designations are explained in the claims.

FIG. 1 shows a schematic side view of a bobbin with closing banding.

FIG. 2 shows an oblique view of a bobbin according to FIG. 1.

FIG. 3 shows a cross-section through a closing banding according to the invention.

FIG. 4 shows a schematic cross-section through part of a bobbin according to FIG. 1.

FIG. 5 shows a bobbin according to FIG. 4 torn open, and

FIG. 6 shows a further configuration of a closing banding according to the invention in cross section.

In detail, FIGS. 1-6 show a bobbin 2 with a closing banding 1, the latter in turn with a paper carrier 3, on whose underside 4 there is a self-adhesive compound 6 in the region of the upper transverse edge 5 (on the left in FIG. 3), while there is a non-adhesive tab 8 in the region of the lower transverse edge 7. Likewise in this region of the lower transverse edge, but separated from the latter by the tab 8, there is a double-sided adhesive tape 9 with a cleavable paper carrier 10 which is coated on both sides with self-adhesive compound 11. The self-adhesive compound 6 is also configured in the form of a double-sided adhesive tape 12, with tear-resistant paper carrier 13 and self-adhesive compound 14, 15 on both sides. In a further embodiment, not shown, the self-adhesive compound 6 is provided in the form of a "pure" self-adhesive compound, that is to say as a uniform strip of a self-adhesive compound, with no carrier and pure adhesive. Products of this type are on the market, for example as tesa fix 51916 (tesa AG). A suitable thickness of this carrier-less self-adhesive compound is 60 μm. The tab is 15 mm long, the overall closing banding is 180 mm long, the adhesive tape 12 is 25 mm wide, the adhesive tape 9 is 25 mm wide. The cleavage strength of the paper carrier 10 is 33-44 c/N/cm. (Duplex filter paper, grammage 51 g/m², thickness 90 μm). The paper carrier 3 consists of coating body paper with a grammage of 95 g/m², as does the paper carrier 13.

The invention claimed is:

1. A method of closing and unclosing a bobbin, said method comprising the following steps:
   a) providing a closing banding on a bobbin, wherein the closing banding comprises:
      i) a paper carrier having an upper transverse edge and a lower transverse edge opposite said upper transverse edge, and which is coated with a self-adhesive compound on its underside in the region of the upper transverse edge, but is not coated on its topside with self-adhesive compound, and has a non-adhesive tab in the region of the lower transverse edge;
      wherein
      ii) a double-sided adhesive tape is arranged on the underside of the paper carrier, between the self-adhesive compound and the tab, the double-sided adhesive tape having a cleavable paper carrier which is coated on both sides with self-adhesive compound;
   b) closing the bobbin by fixing an end of an uppermost layer of the bobbin to a second layer located underneath by bonding the closing banding to an end of the uppermost layer of the bobbin by means of the self-adhesive compound in the region of the upper transverse edge of the closing banding, in such a way that the closing banding projects beyond this end, and fixing the closing banding to the second layer of the bobbin by means of the self-adhesive compound on the cleavable paper carrier of the closing banding; and
   c) unclosing the bobbin by pulling on the projecting tab, causing the cleavable paper carrier to cleave so that an end of the bobbin is liberated, wherein said pulling does not involve splicing the bobbin to another unwinding bobbin.

2. The method as claimed in claim 1, wherein the self-adhesive compound is one for permanent (irreversible) bonding.

3. The method as claimed in claim 1, wherein the self-adhesive compound coated on the underside of the paper carrier in the region of the upper transverse edge comprises a double-sided adhesive tape laminated on or the self-adhesive compound consists of a carrier-less self-adhesive compound.

4. The method as claimed in claim 3, wherein the double-sided adhesive tape comprises a tear-resistant paper carrier coated on both sides with a self-adhesive compound.

5. The method as claimed in claim 1, wherein the self-adhesive compounds are contact adhesive compounds based on acrylates or rubber.

6. The method as claimed in claim 5, wherein the self-adhesive compounds are water-soluble.

7. The method as claimed in claim 1, wherein the length of the tab is 10-25 mm, measured from the lower transverse edge.

8. The method as claimed in claim 7, wherein the length of the tab is 12-18 mm as measured from the lower transverse edge.

9. The method as claimed in claim 1, wherein the closing banding is present in the form of an adhesive tape, optionally wound up into a roll.

10. The method as claimed in claim 9, wherein the closing banding is in the form of an adhesive tape having a width of 20-2000 mm.

11. The method as claimed in claim 10, wherein the closing banding is in the form of an adhesive tape having a width of 22-1500 mm, which adhesive tape is aligned with a width of a parent reel to be secured before the parent reel is cut up into bobbins.

12. The method as claimed in claim 1, wherein the width of the self-adhesive compound measured from a transverse edge is 20-100 mm and the width of the double-sided adhesive tape measured from a transverse edge is 10-100 mm.

13. The method as claimed in claim 12, wherein the width of the self-adhesive compound measured from a transverse edge is 25-60 mm and the width of the double-sided adhesive tape measured from a transverse edge is 15-50 mm.

14. The method as claimed in claim 1, wherein the cleavage strength of the cleavable paper carrier is 20-70 cN/cm.

15. The method as claimed in claim 14, wherein the cleavage strength of the cleavable paper carrier is 22-60 cN/cm.

16. The method as claimed in claim 15, wherein the cleavage strength of the cleavable paper carrier is 25-50 cN/cm.

17. The method as claimed in claim 1, wherein the closing banding is present in the form of individual labels which, optionally, are arranged on an auxiliary carrier, the label width corresponding to the width of the bobbin to be bonded.

18. The method as claimed in claim 1, wherein the closing banding is for a bobbin of cigarette paper.

* * * * *